United States Patent
Sharples et al.

[11] 3,949,965
[45] Apr. 13, 1976

[54] BALL VALVE
[75] Inventors: Thomas D. Sharples, Atherton; John T. Taylor, Santa Clara, both of Calif.
[73] Assignee: Beckman Instruments, Inc., Fullerton, Calif.
[22] Filed: Nov. 9, 1973
[21] Appl. No.: 414,401

[52] U.S. Cl. ................ 251/171; 251/214; 251/315; 251/317
[51] Int. Cl.² ......................................... F16K 3/22
[58] Field of Search ........... 251/315, 317, 214, 171, 251/368, 192, 152; 137/270, 625.47, 375

[56] References Cited
UNITED STATES PATENTS

| | | | |
|---|---|---|---|
| 2,695,628 | 11/1954 | Wheildon | 251/368 X |
| 2,845,949 | 8/1958 | Parker | 251/315 X |
| 3,026,899 | 3/1962 | Mischanski | 137/375 |
| 3,111,136 | 11/1963 | Persidsky | 251/368 X |
| 3,385,313 | 5/1968 | Okada | 251/315 X |
| 3,458,172 | 7/1969 | Burrows | 251/214 X |
| 3,550,902 | 12/1970 | Pidgeon | 251/315 X |
| 3,717,323 | 2/1973 | Geipel | 251/315 |
| 3,735,956 | 5/1973 | Matousek | 251/315 |

FOREIGN PATENTS OR APPLICATIONS

| | | | |
|---|---|---|---|
| 676,093 | 11/1929 | France | 251/171 |

Primary Examiner—Alan Cohan
Attorney, Agent, or Firm—R. J. Steinmeyer; F. L. Mehlhoff

[57] ABSTRACT

A small ball valve for chemically active materials is provided which does not require the strength of metal parts and which permits the use of brittle material such as glass or ceramic as well as materials such as fluorocarbon polymers and polytetrafluoroethylene which are resistant to the action of chemically active fluids. A free-floating construction is provided without requiring a stem packing gland and permitting the stem to be integral with the ball. Identical sealing rings are provided with clamping screws which press the sealing rings inward against the ball and outward against the openings in the valve body, the diameter of the valve stem being smaller than the opening in the sealing ring and clamping screw therefor so that the portion of the ball surrounding the valve stem may also float freely under the sealing means with the seal around the ball stem being against the ball itself instead of against the valve stem. For reinforcement of the valve body or to permit the use of the valve when the controlled fluid is under high pressure a metal reinforcing ring may be fitted around the valve body.

6 Claims, 9 Drawing Figures

BALL VALVE

BACKGROUND OF THE INVENTION

In certain laboratory chemical processes small compact valves are desirable which are capable of handling fluids which may react upon metals and elastomeric O-ring materials. For example, present methodology in peptide synthesis demands that metering and reaction vessel valves handle material such as methylene chloride, trifluoroacetic acid, dioxane 4N HCl, triethyl amine and dimethyl formamide. For this use glass or ceramic ball valves of the type heretofore available with seats composed of polytetrafluoroethylene are too large. Such valves require ball to stem floating connections and the design cannot be reduced to scale because of the strength problems at the ball to stem floating connection. Small ball valves with integral stems have been invariably composed of metal. The substitution in conventional ball valve designs of nonmetallic materials such as a fluorocarbon product sold under the trademark, Kel-F, glass or ceramic for metal is impractical because of over constraint due to the stem packing gland.

Nevertheless ball valves have certain inherent advantages such as ease with which perfect spheres can be generated and the fact that a free-floating ring will mate perfectly with a sphere and that the wear form of a circular ring and a sphere is, in turn, a circle and a sphere. It is desirable, therefore, that a ball valve be so arranged that the seats and the ball are free to rotate optimally for seating and operation. The freedom of seating is lost with an integral stem ball valve in that the ball is constrained by the packing against the stem.

It is accordingly an object of the invention to provide a construction in which the stem packing is replaced by a circular ring bearing against the sphere so that it will have the same advantageous location and wear characteristics enjoyed by the seats of conventional ball valves.

A further object of the invention is to locate the ring seats and ring seals for the valve stem so that forces on the ball are balanced with the loads on the rings centered and intersecting at the center of the sphere.

A still further object of the invention is that the seats and stem seals and associated parts be identical for the inlet and outlet openings and for the stem seal.

Still another object of the invention is to obtain the advantages of a ball valve in a small size composed of materials which are resistant to active chemical reagents.

The invention also has for its object the complete separation of reinforcing ring and pressurizing threads from the flow path, symmetrical and uniform distribution of sealing forces, self-alignment of the valve seats in accordance with a floating-ring principle, elimination of leakage paths and employment of one-piece seal and tube connector fittings, reduction of dead volume to a minimum, and relative simplicity of parts.

Other and further objects, features and advantages will become apparent as the description proceeds.

SUMMARY OF THE INVENTION

In carrying out the invention in accordance with a preferred form thereof the advantages of an integral stem ball valve are obtained without necessitating a packing gland to prevent leakage around the stem connected to the ball. This is accomplished by providing a ring type seal, preferably identical with the seals used around the valve ports, which bears against the spherical surface of the ball instead of against the peripheral surface of the valve stem in addition to bearing against the internal, lateral surfaces of the opening through which the valve stem extends. Three or more identical openings are formed in a valve body, one to receive the valve stem and the others for the fluid ports. Preferably a symmetrical construction is employed with equal angles between the openings in the valve body. In the case of a simple on-off valve with an inlet opening, outlet opening and the opening for the valve stem, the axes of the openings are 120° apart where they lie in the same plane.

The openings in the valve body have cylindrical bores and the ring type seals are formed with spherically shaped end portions to fit against the spherical surface of the ball and form valve seats. The seals also have circular portions or cylindrical surfaces to fit within the cylindrical bore of the opening in the valve body. In order that the respective surfaces of the ring type seal may be pressed against the surfaces to be sealed, the peripheral portion of the seal is formed with a lip extending away from the end portion and surrounding an annular groove. Clamping screws or bushings are provided to press into the annular grooves to seat the sealing member against the ball and against the bore of the opening in the valve body.

Preferably a resilient O-ring is mounted in the annular groove and a pressure exerting ring is interposed between the O-ring and the clamping screw.

In order that the forces will be balanced with the seals freely floating, the axes of the valve openings intersect at the center of the valve body, and are angularly, equally spaced. In addition, the valve stem is of smaller diameter than the opening in the surrounding clamping screw or bushing so that there is no constraint upon the valve stem.

A better understanding of the invention will be afforded by the following detailed description considered in conjunction with the accompanying drawings.

DRAWINGS

In the drawing

FIG. 1 is a view of a section of a conventional or prior art type of ball valve represented as cut by a plane extending through the center of the valve body and through the axes of the inlet and outlet openings and perpendicular to the axis of the valve stem, FIG. 2 is a view of a section through an on-off type ball valve forming an embodiment of the invention represented as cut by a plane through the center of the valve body and through the axes of the inlet and outlet openings and the axis of the valve stem, FIG. 3 is a fragmentary sectional view of a portion of the device of FIG. 2 illustrating the manner in which a sealing ring serves to seal the valve seat and in the bore of the valve opening with free-floating action of the sealing ring, FIG. 4 is a perspective view of a modified construction which may be employed for forming a diverting valve with one inlet opening and two outlet openings or vice versa in addition to the opening for the valve stem, FIG. 5 is a side view of another diverter-valve modification in which the valve body is in the form of a truncated cone, FIG. 6 is an exterior view of the embodiment of FIG. 2 as seen looking toward the valve wheel or handle on the valve stem, FIG. 7 is another exterior view of the embodiment of FIG. 2 and FIG. 6 as seen from the end of a clamping nut or bushing with the bushing secured against rotation by a forked clamp, FIG. 8 is a simplified sectional view of the embodiment of FIG. 4 with seals omitted illustrating the operation of a diverting valve in accordance with the invention, and FIG. 9 is a view of a cross section of another modification of the type represented in FIG. 5 forming a diverting valve having a plurality of more than two outlet openings and one inlet opening, or vice versa, represented as cut by a plane through the axes of the valve stem, and of three of the port openings.

Like reference characters are utilized throughout the drawings to designate like parts.

DETAILED DESCRIPTION

Figure 1:
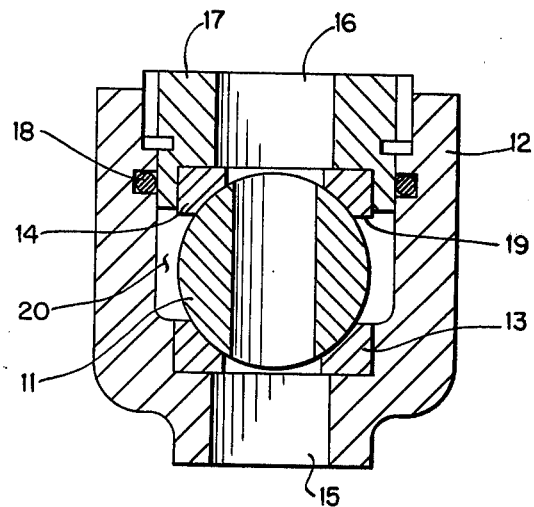

In one form of conventional ball valve as illustrated in FIG. 1 an apertured ball 11 is rotatably mounted in a valve body 12 having valve seats 13 and 14 at fluid openings 15 and 16. One of the seats 14 is mounted in a tube connector in the form of an insert 17 which is sealed in the bore around this insert by means of an O-ring 18 composed of a conventional resilient material such as rubber or synthetic rubber. The O-ring 18, however, cannot prevent valve seat leakage around a path 19 between the valve seat 14 and the insert 17. Moreover, resilient, homogeneous O-rings are not available in a material which is resistant to various highly active reagents, strong oxidizing acids and various liquids such as hot jet fuels which cause deterioration of conventional O-ring material. The construction also results in some dead space 20.

Figure 2:
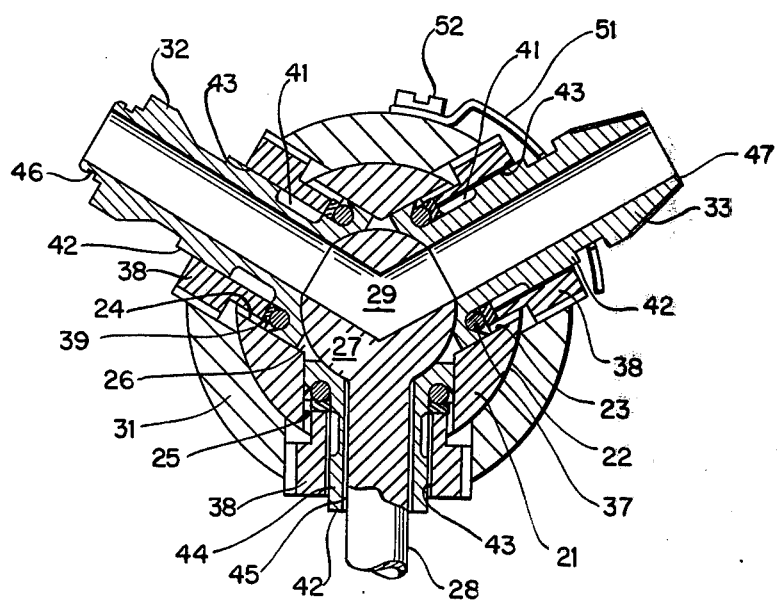

For an on-off or open-shut type of valve performing the function of the conventional ball valve of FIG. 1, in accordance with the invention, a construction is employed such as illustrated in FIG. 2. There is a valve body 21 which may have a cylindrical outer surface 22 having three peripheral equally spaced openings or bores 23, 24 and 25 and a hollow center 26. There is a valve ball 27 connected to a valve stem 28, preferably integral therewith and having a through passageway 29 angled or curved to be aligned with the bores 23 and 24 for fluid passageways. The valve stem 28 extends through the bore 25 in the valve body 21.

A floating connection between the stem 28 and the ball 27 is not necessary and they may be rigidly connected as a result of being formed in one integral piece of the same material as shown in the drawing. However, the invention does not exclude some other type of rigid connection of different materials as, for example, a metal stem with a glass, vitreous or ceramic ball cemented or fused to the metal stem or two different brittle materials fused or cemented to each other.

The valve body 21, the ball valve 27 and the valve stem 28 are composed of a relatively rigid, self-supporting material which is relatively stable chemically and is not readily dissolved or attacked by reagents such as methylene chloride, trifluoroacetic acid, dioxane 4N HCl, triethyl amine, dimethylformamide, strongly oxidizing acids and the various petroleum products such as jet fuels even at high temperatures. A brittle material such as glass or ceramic may be used. As shown in the drawings the valve ball 27 and the valve stem 28 integral therewith are solid except for the passageway such as the through passageway 29 as shown in FIG. 2 or the passageway 58 shown in FIGS. 8 and 9. Specific materials which have been found satisfactory, although relatively brittle, include vitreous material such as that sold by Corning Glass Company as Pyrex (Corning 7740) and ceramic materials such as high fired alumina. The construction is not subject to the limitations of strength, fragility and brittleness of glass and ceramics which have been applied to conventional ball-valve construction. A free-floating connection is not necessary between the ball and the valve stem as in conventional use of brittle material. However, a more resilient material may also be used, e.g., a fluorocarbon product such as a polymer of chlorotrifluoroethylene elastomer such as that sold by the Minnesota Mining Company under the trade name Kel-F. The construction of the invention is particularly appropriate for ball valves with integral ball and stem although it is not limited thereto. If additional strength is desired in such more resilient material, this may be achieved by providing a reinforcing ring 31 composed of metal such as stainless steel or brass, which also permits the valve to handle fluids at high pressures by preventing expansion of the ports.

Figure 3:
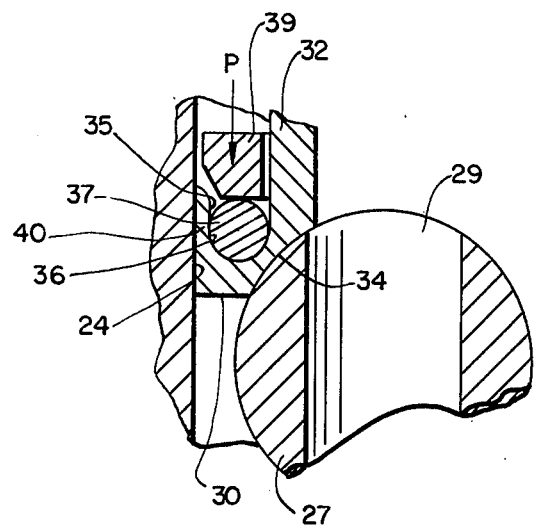

For sealing the ports and providing connections to fluid lines controlled by the valve, members 32 and 33 are provided which form combination ball seals, body seals and tube connectors. The outward ends serve as tube connectors and the inward ends as sealing members. In the case of the connector-seal 32 there is an inner end (FIG. 3) having a portion with a concave spherical surface 34 to form a valve seat fitting the spherical surface of the ball 27 and having a lip portion 35 fitting against the inner cylindrical surface or bore 24. The lip 35 is formed by providing an annular groove 36 spaced from the inner end 30 and the valve seat 34. The groove 36 is, as shown, in a portion 40 of the member 32 which is of greater diameter than the remainder of the member.

For enabling sealing pressure to be exerted both radially, inward against the ball 27 and laterally against the surface of the bore 24 or away from the axis of the bore, an O-ring 37 is provided which is receivable in the annular groove 36 and adapted to be pressed inward by a suitable device such as a clamping screw or bushing 38 (FIG. 2). The O-ring 37 may be composed of conventional resilient material which will exert both lateral and inward pressure when it is compressed by an inwardly acting force. Since the O-ring 37 is not exposed to the chemically active fluids to be handled by the valve, conventional O-ring materials are usable. Preferably a pressure exerting ring 39 is interposed between the inward end of the clamping nut 38 and the O-ring 37; and the pressure exerting ring 39 may be composed of a suitable strong material, such as metal, particularly stainless steel, for example.

The sealing and tube-connector members 32 and 33 are composed of a chemically resistant material of less rigidity than the valve body and the valve ball and valve stem and sufficient flexibility for forming freely-floating valve and body seals at the surfaces 34 and 24. A suitable material for this purpose is a polymer such as polytetrafluoroethylene sold by the duPont de Nemours Company under the trade name Teflon. For enhanced flexibility of the sealing portions of the members 32 and 33, the portions near the inner ends 30 (FIG. 3) are formed with reduced diameter to provide necks 41 (FIG. 2), thus providing flexibility for permitting the inner end portion to seat readily against the spherical surface 34 and the bore 24. On the other hand, in order to avoid excessive flexing when connected tubing is handled, beyond the necked portion 41 an enlarged diameter portion 42 is provided of sufficient diameter to make a loose fit within the bore 43 of the clamping screw 38.

The bore 25 through which the valve stem 28 extends is provided with a sealing member 44 of the same conformation as the inner portions 40 and 42 of the combined tube connector and sealing member 32 or 33 and with a clamping screw 38 which may be and preferably is identical with those used in the bores 23 and 24. The diameter of the valve stem 28 is made less than the internal diameter or bore of the ring seal 44 to provide a clearance 45 in order to avoid any constriction on the floating and seating of the ball 27 notwithstanding the fact that by reason of the construction and mounting arrangement the ball stem 28 is substantially constrained to rotate about its axis.

Tube connector ends of any desired form may be employed according to the type of connection to be made. For example, in the case of the combination tube connector and seal 32 an end configuration 46 may be utilized which is adapted to mate with flanged glass tubing using an O-ring, but the end may be machined for other types of connections.

Figure 7:
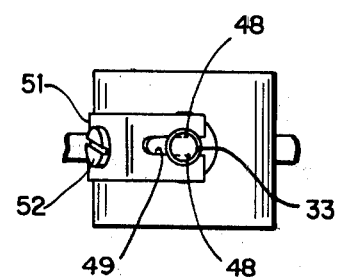

For the sake of illustration the combination tube connector and seal 33 is shown with a tapered and threaded end 47 adapted for making a conventional pipe joint. In order to prevent the unit 33 from turning when a pipe coupling is turned onto the threaded end 47, flat sides 48 may be formed as shown in FIG. 7 adapted to fit within a slot 49 of a bracket 51 secured to the valve body 21 or the reinforcing ring 31 by any suitable means such as a screw 52.

Figure 4:
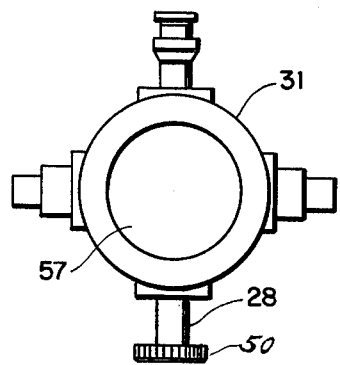
Figure 8:
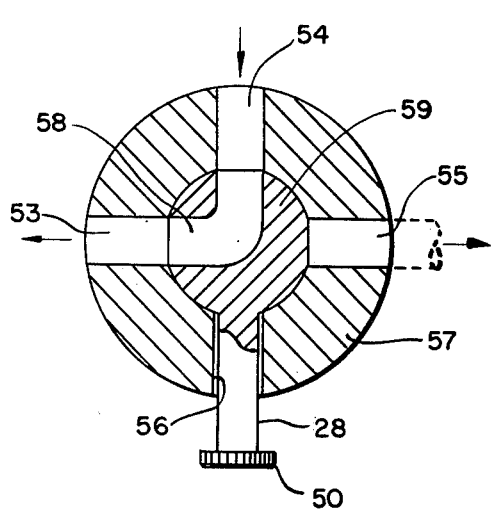

In FIGS. 2, 3, 6 and 7 a valve construction has been illustrated by means of which fluid flow may be controlled between an inlet connection and an outlet connection such as the tube connectors 32 and 33 or vice versa. However, the advantages of the balanced construction are not limited to on-off valves but may be employed also in diverter valves such as illustrated in FIGS. 4 and 8, for example, having three openings or bores 53, 54 and 55 in addition to an opening 56 for a valve stem 28 formed in a modified valve body 57. In this case an angled passageway 58 is formed in the valve ball 59 to permit connecting the valve bore 54 alternatively to the valve bore 53 or 55 by turning a handle 50 so that fluid entering the bore 54 may be diverted to either the bore 53 or the bore 55, or the reverse arrangement may be employed with fluid from either bore 53 or 55 being directed through the bore 54 as an outlet bore.

The diverter type valve of FIGS. 4 and 8 has been illustrated as being formed in a substantially cylindrical valve body surrounded by a reinforcing ring 31 with the axis of the valve stem 28 forming a radius and the axes of the bores 55, 54 and 53 also forming radii spaced successively 90° apart so that a balanced construction is provided with all radii intersecting at the center of the valve body 57 and the inward forces of the clamping screws all acting through the center. However, the invention is not limited to having the radii spaced at 90°.

Figure 9:
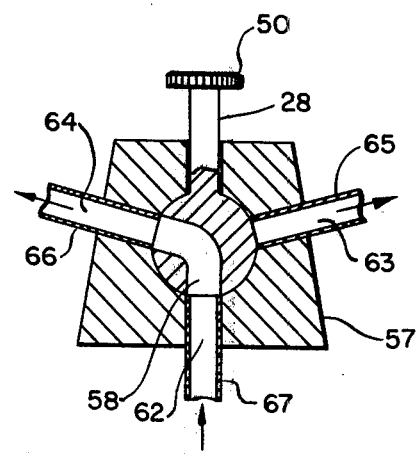

Moreover, the invention is not limited to an arrangement in which all of the axes of the bores are in the same plane. For example, as illustrated in FIG. 9, a valve body 61 may be employed with a valve stem 28 having a common axis with a bore 62 for a connector 67 and a plurality of angularly spaced bores 63, 64 and so forth, cooperating with a plurality of tube connectors 65, 66 and so forth, which may be two, three or more in number so that a tube connector 67 in the bore 62 may be alternatively connected to any one of the tube connectors 65, 66, etc. The valve body is shown in the form of the frustum of a cone but the invention is not limited thereto.

Figure 5:
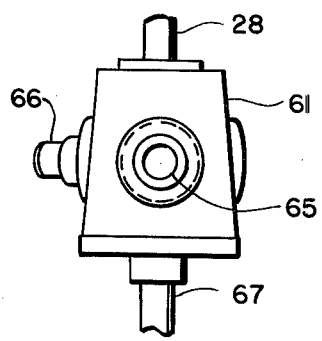
Figure 6:
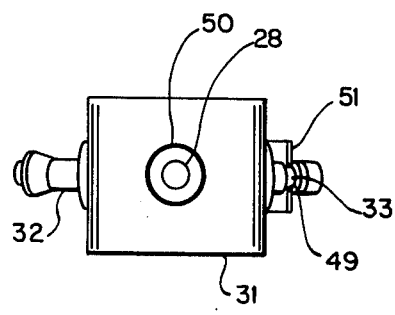

In the construction of FIG. 5, the use of a valve body formed as a truncated cone permits providing sufficient clearance between the bore for the valve stem and the ports to enable the same seal to be used for the valve stem bore as for the ports without necessitating that the spaces required for the seals should intersect when a relatively large ball is used.

It is apparent that the present invention permits the use of chemically resistant materials in a ball-type valve without mechanical weakness, provides free floating of ring-type seals, avoids constriction on the valve stem and provides balancing of forces acting through the common center of the valve. Although particular components, structure and form have been discussed in connection with specific embodiments of ball valves constructed in accordance with the teachings of the present invention, others may be utilized. Furthermore, it will be understood that although exemplary embodiments of the invention have been disclosed and discussed, other applications and mechanical arrangements are possible and that the embodiments disclosed may be subjected to various changes, modifications and substitutions without necessarily departing from the invention.

What is claimed is:

1. A valve comprising in combination:
   a valve body with communicating, angularly equally spaced openings therein including an inlet opening, and an outlet opening,
   a valve ball having a passageway therethrough,
   means for rotating the ball to bring the passageway therein into or out of registry with body openings,
   hollow sealing members formed with peripheral shoulders around inner ends thereof fitting the valve body openings, the inner ends being adapted to seat upon the ball,
   clamping means for pressing the shoulders inward to press the inward ends upon the ball, the shoulder at the inner end of each sealing member being formed with an annular groove open toward the upper end of the sealing member and the groove being surrounded by a lip fitting the opening in the valve body, and
   an O-ring mounted in each annular groove with means for pressing the O-ring inward to expand the lip against the valve body opening for sealing the opening.

2. A valve as defined in claim 1 wherein a pressure-transmitting ring is interposed between the clamping means and the O-ring.

3. A valve comprising in combination:
   a valve body with communicating, angularly equally spaced openings therein including an inlet opening, and an outlet opening,
   a valve ball having a passageway therethrough,
   means for rotating the ball to bring the passageway therein into or out of registry with body openings,
   hollow sealing members in generally elongated form fitting in the body openings and having narrow diameter neck portions at the inward ends thereof to provide flexibility to the inwardly extending portions of the sealing member to form floating seats at the inward end of the sealing member resting against the ball valve, and a bushing type clamping screw having an internal diameter greater than the diameter of the neck portion of the sealing member and a portion of the sealing member outward from the necked portion being of greater diameter to provide a loose fit in the internal diameter of the clamping screw and protect the sealing member against excessive deflection.

4. A valve comprising in combination:

a valve body with communicating, angularly equally spaced openings therein including an inlet opening, and an outlet opening, a valve ball having a passageway therethrough, means for rotating the ball to bring the passageway therein into or out of registry with body openings, and hollow sealing members fitting in the body openings, at least one of the sealing members having the outward end thereof threaded, flat sides being formed on the outer surface of the sealing member and a bracket being secured to the valve body having a slot therein fitting flat sides of the sealing member to permit turning a threaded fitting onto or off the sealing member without subjecting the inner end thereof to rotation.

5. In a ball valve having a valve body with fluid passageway ports and a ball rotatable in the valve body with ports cooperating with the valve body ports and a stem connected to the ball stem, the valve body having an opening surrounding the stem, the improvement which comprises:

packing to prevent leakage around the valve stem which comprises ring sealing means contacting the ball around the valve stem but spared from the valve stem and contacting the valve body in the portion thereof surrounding the valve stem, the sealing means having an end portion contacting the spherical surface of the valve ball and a pheripheral portion contacting the walls of the valve body surrounding the valve stem, a neck portion adjacent the end portion and a lip surrounding the neck portion extending away form the end portion to form an annular groove and force applying means located in said annular groove, whereby force applied in the annular groove presses the end portion of the sealing means against the spherical ball surface and presses the lip against the walls of the valve body opening surrounding the valve stem.

6. A ball valve comprising:

a rotatable valve ball having fluid passageways therein and a stem connected to the ball, a valve body having a hollow center receiving said ball and a plurality of radially extending openings, including an opening receiving said stem and other openings for fluid passageways, valve seats in ring form with surfaces contacting said ball and said valve-body openings to seal the openings, one of said valve seats surrounding said stem but being spaced therefrom, said ball passageways being located to cooperate with valve-body fluid passageways as determined by angular position of the valve ball, said valve body openings, and said valve seats being geometrically symmetrical with respect to the center of said ball, and clamping means in each of said openings for applying radially inward forces to said valve seats, said clamping means being symmetrically located to apply balanced forces acting symmetrically in directions intersecting at the ball center.

* * * * *